(12) United States Patent
Muraishi

(10) Patent No.: US 8,665,497 B2
(45) Date of Patent: Mar. 4, 2014

(54) IMAGE PROCESSING APPARATUS, IMAGE PROCESSING METHOD AND PROGRAM

(75) Inventor: Masaaki Muraishi, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 13/130,047

(22) PCT Filed: Jul. 6, 2010

(86) PCT No.: PCT/JP2010/004396
§ 371 (c)(1),
(2), (4) Date: May 18, 2011

(87) PCT Pub. No.: WO2011/004582
PCT Pub. Date: Jan. 13, 2011

(65) Prior Publication Data
US 2011/0228348 A1 Sep. 22, 2011

(30) Foreign Application Priority Data
Jul. 10, 2009 (JP) ................................. 2009-163921

(51) Int. Cl.
*H04N 1/40* (2006.01)
(52) U.S. Cl.
USPC .......................................... 358/3.15; 358/3.27
(58) Field of Classification Search
USPC .......... 358/1.9, 2.1, 3.15, 3.27; 382/266–270, 382/199–200
See application file for complete search history.

(56) References Cited

U.S. PATENT DOCUMENTS

| | | | |
|---|---|---|---|
| 6,333,993 B1* | 12/2001 | Sakamoto | 382/173 |
| 6,603,880 B2* | 8/2003 | Sakamoto | 382/173 |
| 6,894,699 B2* | 5/2005 | Someya et al. | 345/611 |
| 8,306,261 B2* | 11/2012 | Connell, II | 382/103 |
| 2010/0245952 A1 | 9/2010 | Muraishi | 358/505 |

FOREIGN PATENT DOCUMENTS

| | | |
|---|---|---|
| JP | 2004-147193 | 5/2004 |
| JP | 2009-021681 | 1/2009 |

OTHER PUBLICATIONS

International Search Report and Written Opinion, in counterpart International Application No. PCT/JP2010/004396.

* cited by examiner

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

An image processing apparatus detects an edge from image data and generates edge data indicating a result of the detection, obtains a variance value of the generated edge data, and determines that the image data is data with print information when the obtained variance of the edge data is equal to or larger than a threshold and determines that the image data is data without print information when the variance is smaller than the threshold value.

13 Claims, 13 Drawing Sheets

IMAGE PROCESSING APPARATUS, IMAGE PROCESSING METHOD AND PROGRAM

TECHNICAL FIELD

The present invention relates to an image processing apparatus which determines whether read image data is image data with print information or blank image data without print information.

BACKGROUND ART

A copying machine with an automatic original reading device reads both sides of original sheets even when original sheets printed on both sides and original sheets printed on one side are mixed.

However, in this method, blank sheet side of the original sheet printed on one side is also read. As a result, the process speed is decreased because of unnecessary data processing.

In addition, when printing out of the read original is performed, a blank sheet side without printing information is also printed, which results in a waste of paper resource.

To solve those problems, Japanese Patent Application Laid-Open No. 2004-147193 proposes a blank sheet determination method in which a compression process is performed on image data obtained from a read original, and the data quantity of the compressed data is used for determining whether or not the read original is a blank sheet.

In addition, Japanese Patent Application Laid-Open No. 2009-021681 proposes a blank sheet determination method in which an edge portion of image data obtained from a read original is detected, and the detected edge quantity is used for determining whether or not the read original is a blank sheet.

CITATION LIST

Patent Literature

PTL 1: Japanese Patent Application Laid-Open No. 2004-147193

PTL 2: Japanese Patent Application Laid-Open No. 2009-021681

SUMMARY OF INVENTION

Technical Problem

When discriminating a blank sheet that is an original without print information (including a colored paper original) from an original with print information, it is important to determine whether or not the original as a target of determination has print information, without being affected by a paper type of the original or a color of the background.

The method described in Japanese Patent Application Laid-Open No. 2004-147193 performs compression on image data read from the original and determines whether or not the original is a blank sheet, based on the data size of the compressed data.

In general, when an original is read with a scanner, noise is generated in the reading process due to the nature of the scanner or paper quality of the original. This noise is generated in reading any type of original.

However, when a white color original is read, the read value without noise is already 255 that is the upper limit of the dynamic range (in the case of image data having a signal value of 8 bits for each of RGB colors). The read value varies due to noise and read value may exceed 255. However, the read value may not take a value equal to or larger than 255. Accordingly, even when the read value is actually above 255, it is regarded to be 255 all the same. Therefore, all the variation due to noise does not affect the read value. For this reason, the influence of noise is not so conspicuous for the blank original.

In contrast, when a colored original is read, the read value without noise is not close to 255. Accordingly, when the read value varies due to noise, the read value does not exceed 255 and is not clipped to 255. Therefore, all the variation due to noise affects the read value.

Therefore, when a colored original or the like is read, the compression ratio may be decreased and the data size may be increased because of influence of the noise.

For this reason, in the method of Japanese Patent Application Laid-Open No. 2004-147193, the data size after compression of the image data obtained from the original is increased when a colored paper original is read, as compared with the case where a blank original is read. Normally, the size of data obtained by compressing data on a white color original with print information is larger than the size of data obtained by compressing data on a colored original without print information, and hence it should be easy to discriminate between the two originals. However, because of the noise described above, there is a problem that only a small difference in compressed data size is produced between the two originals, and hence it is difficult to discriminate between the two originals.

In addition, the method described in Japanese Patent Application Laid-Open No. 2009-021681 may detect noise generated due to impurities or the like contained in, for example, recycled paper. Therefore, when a white color original has little print information thereon, there may be a case where no difference appears in edge quantity of impurities between the white color original with print information and the recycled paper. Therefore, there is a problem that it is difficult to determine whether the detected edge is due to print information or due to noise generated by the impurities, and that it is difficult to perform the blank sheet determination by using the edge quantity.

Solution to Problem

The present invention has been made to solve the above-mentioned problems. It is an object of the present invention to provide an image processing apparatus capable of improving accuracy of blank sheet determination in the process of performing the blank sheet determination for determining image data (original) without print information.

In order to solve the problems discussed above, the present invention provides with an image processing apparatus which detects an edge from image data and generates edge data indicating a result of the detection, obtains a variance value of the generated edge data, and determines that the image data is data without print information when the obtained variance value of the edge data is equal to or larger than a threshold value and determines that the image data is data with print information when the variance value is smaller than the threshold value.

Advantageous Effects of Invention

According to the present invention, influence to blank sheet determination error due to a paper type of an original or background color of the original may be reduced, and accuracy of determining whether or not the read original is a blank sheet with print information may be improved.

Further features of the present invention will become apparent from the following description of exemplary embodiments with reference to the attached drawings.

DESCRIPTION OF EMBODIMENTS

Hereinafter, embodiments of the present invention are described with reference to the attached drawings.

Figure 16:
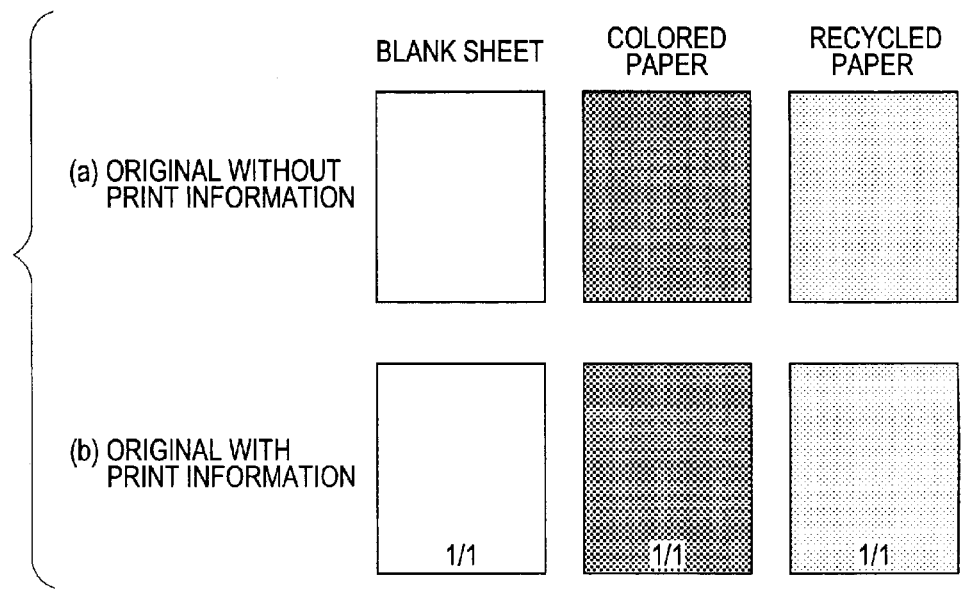
FIG. 16 is a diagram for illustrating a definition of the blank sheet according to the present invention.

In the description, the blank sheet means an original without print information as illustrated in FIG. 16. As long as there is no print information, an original with color like colored paper or an original of recycled paper are also treated as a blank sheet. In addition, image data obtained by reading the blank sheet is also referred to as blank sheet. In contrast, as illustrated in FIG. 16, an original with a minute character such as a page number is not a blank sheet.

First Embodiment

Figure 1:
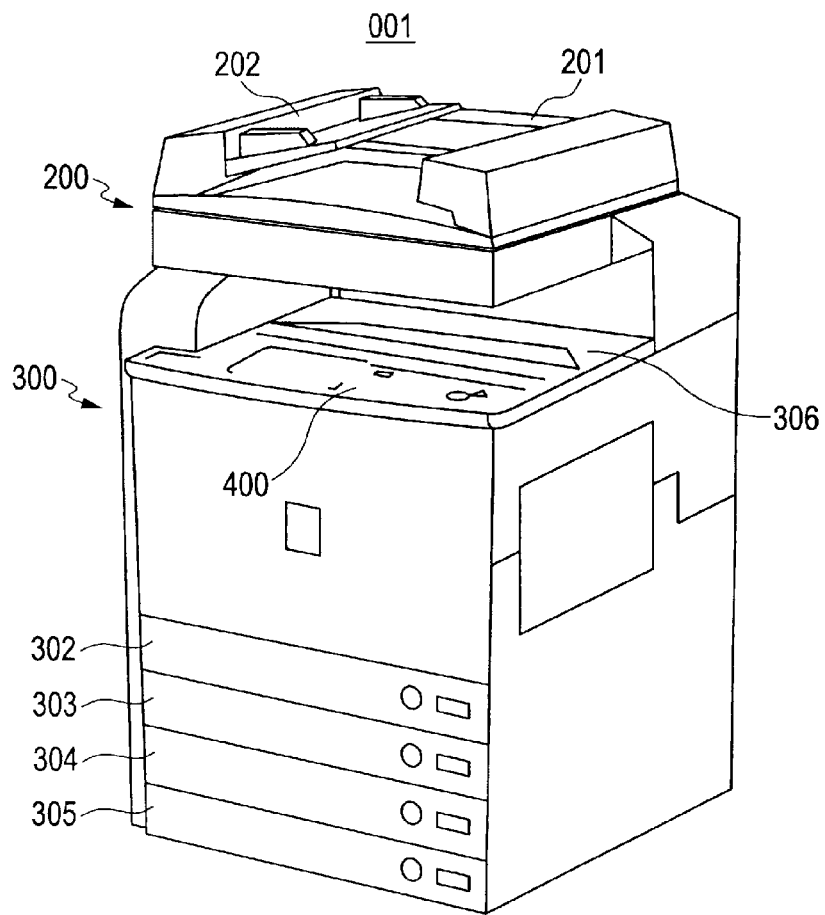
FIG. 1 is a general view of a digital multifunction printer that is suited for application of the present invention.

FIG. 1 is a diagram illustrating a configuration of a digital multifunction printer 1 including an input device and an image processing system that are suited for application of this embodiment.

{Image Input Unit (Scanner)}

Figure 2:
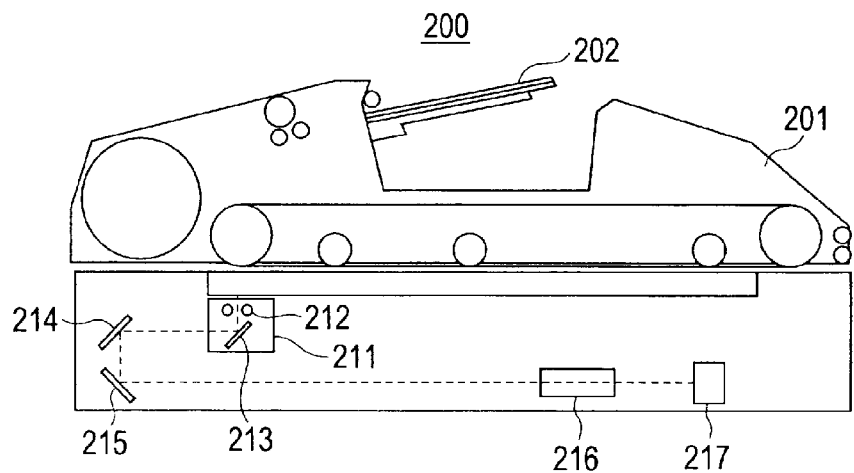
FIG. 2 is a block diagram illustrating a configuration of a scanner of the digital multifunction printer that is suited for application of the present invention.

A scanner 200 that is an image input device illustrated in FIG. 1 is illustrated in detail in FIG. 2.

FIG. 2 illustrates a scanner unit 211, which includes an original illumination lamp 212 and scanning mirrors 213 to 215.

The scanner unit 211 guides reflection light from an original to a charge-coupled device (CCD) sensor 217 including a sensor, via the scanning mirrors 213 to 215 and a lens 216.

Next, the CCD sensor 217 converts the light into an electric signal indicating image data.

Figure 3:
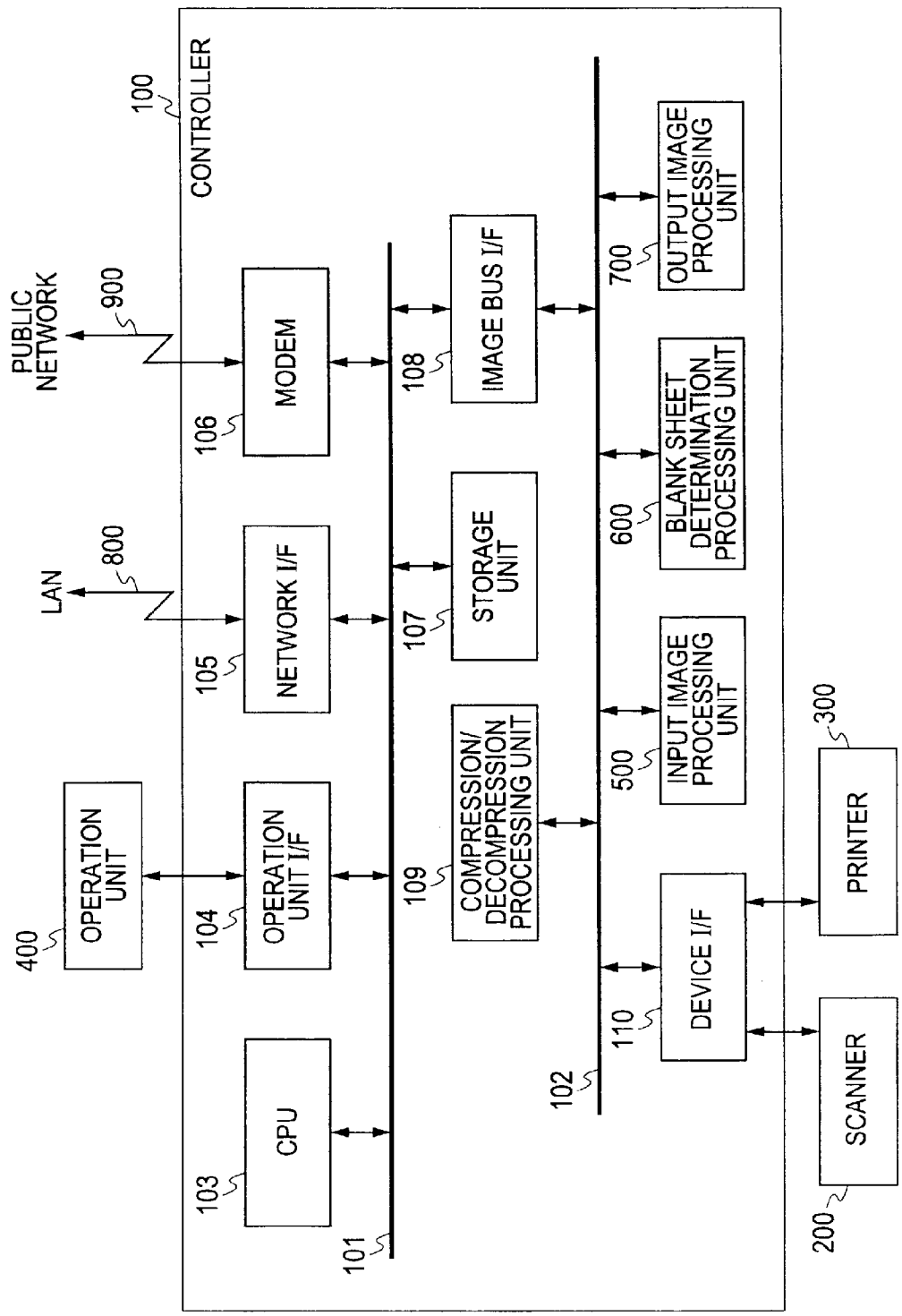
FIG. 3 is a block diagram illustrating a control system configuration of the digital multifunction printer that is suited for application of the present invention.

Original paper sheets are set on a tray 202 of an original feeder 201, and a user instructs to start reading from an operation unit 400 illustrated in FIG. 1, so that a read operation is started. Specifically, a central processing unit (CPU) 103 illustrated in FIG. 3 provides an instruction to the scanner 200. According to the instruction, the feeder 201 feeds the original paper sheets one by one so that the read operation of original images is performed.

There are two types of devices for reading the original from the feeder. One is a reverse double-sided type that scans one side of the original and then reads the other side after reversing the original. The other is a one-pass double-sided type that reads both sides simultaneously by one operation. The present invention is not limited to either of them in particular.

{Image Output Unit (Printer)}

In FIG. 1, a printer 300 serving as an image output device is a portion for printing image data instructed to output as an image on a paper sheet.

The image data is obtained by reading the original with the above-mentioned scanner. This image data is output to be printed on the paper sheet by the following print method.

There are various print methods including an electrophotography method in which a photosensitive drum or a photosensitive belt is used for fixing toner on a paper sheet, and an inkjet method in which a micro nozzle array jets ink for directly printing an image on a paper sheet. The print method of this embodiment is not limited to any of the above-mentioned methods in particular.

The print operation is started by instruction provided from the CPU 103 as a controller. The printer 300 includes multiple paper feed stages so that different paper sheet sizes or different paper sheet orientations may be selected, and has paper sheet cassettes 302, 303, 304, and 305 corresponding to the multiple paper feed stages. In addition, a receiving tray 306 receives paper sheets after the print.

{Control System Configuration of Digital Multifunction Printer}

A control system configuration of the digital multifunction printer 1 that is suited for application of this embodiment is illustrated in FIG. 3. A controller unit 100 is connected to the scanner 200 serving as an image input device and the printer 300 serving as an image output device. On the other hand, the controller unit 100 is connected to a local area network (LAN) 800 and a public network 900, so as to input and output image data and device information.

The CPU 103 functions as a controller which controls the digital multifunction printer 1 in general.

A storage unit 107 stores image data and compressed data, and includes a system working memory for the CPU 103 to operate.

An operation unit interface (I/F) 104 is an interface unit with an operation unit 400, and outputs image data to be displayed on the operation unit 400 to the operation unit 400. In addition, the operation unit I/F 104 transmits information input by the user from the operation unit 400 to the CPU 103.

A network I/F 105 is connected to the LAN 800 for input and output of information. A modem 106 is connected to the public network 900, so as to perform a modulation and demodulation process for sending and receiving data.

The above-mentioned configuration is arranged on a system bus 101.

An image bus I/F 108 is a bus bridge which connects the system bus 101 to the image bus 102 for transferring image data at high speed, and converts data structure.

The image bus 102 includes a high speed bus such as a PCI bus, or IEEE1394.

A device I/F unit 110 connects the scanner 200 and the printer 300 serving as input and output devices to the controller 100 so as to perform synchronous/asynchronous conversion of image data.

A compression/decompression processing unit 109 performs compression process on the image data and edge data that is described later by predetermined compression methods.

An input image processing unit 500 performs correction, conversion, and editing on the image data read by the scanner 200, and performs an appropriate process for print output or image transmission afterward.

A blank sheet determination processing unit 600 determines whether or not the image data input by the scanner 200 is a blank sheet based on a compressed data ratio of the edge image that is compressed by the compression/decompression processing unit 109.

An output image processing unit 700 performs correction, resolution conversion, or the like corresponding to the printer, on the print output image data.

Figure 4:
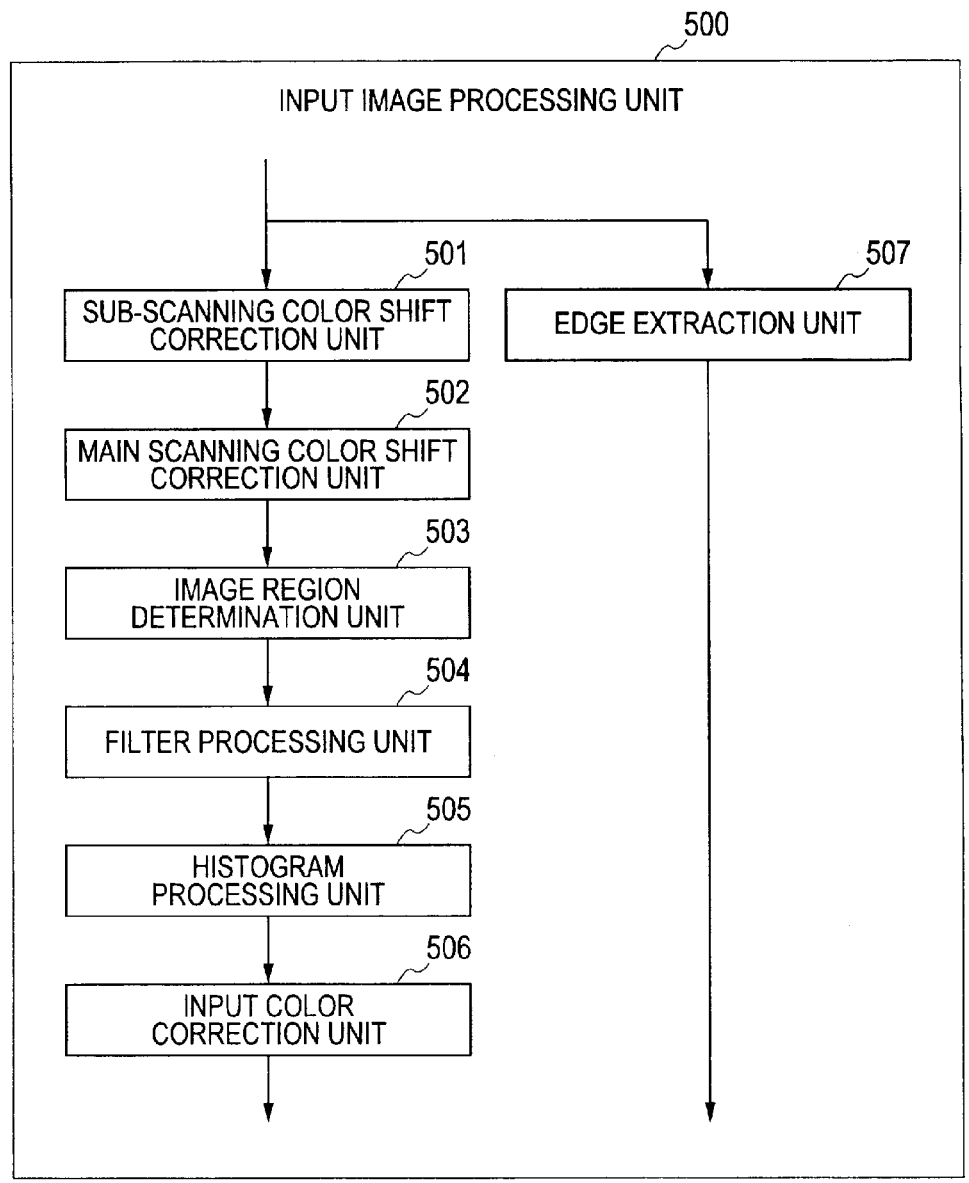
FIG. 4 illustrates an input image processing unit of a first embodiment according to the present invention.

FIG. 4 is a block diagram illustrating a detailed configuration of the input image processing unit 500 of an image processing apparatus according to a first embodiment of the present invention.

In the drawing, a sub-scanning color shift correction unit 501 corrects color shift in the sub-scanning direction of the input image data, and performs, for example, 1×5 size filter operation for each color of the image data.

A main-scanning color shift correction unit 502 corrects color shift in the main-scanning direction of the input image data, and performs, for example, 5×1 size filter operation for each color of the image data.

An image region determination unit 503 discriminates an image type in the input image data and distinguishes pixels constituting individual image types of, for example, a photograph part or a character part, and a chromatic part or an achromatic part, in the input image. Then, the image region determination unit 503 generates attribution flag data indicating a type thereof for each pixel.

A filter processing unit 504 corrects spatial frequency of the input image data in an arbitrary manner and performs a filter operation of, for example, a 9×9 size.

A histogram processing unit 505 samples and counts image signal data in the input image data and makes, for example, a determination of whether the input image data is color image data or monochrome image data, or a determination of a background level of the input image data.

An input color correction unit 506 performs correction of color tint of the input image data and performs, for example, a process of converting a color space of the input image into an arbitrary color space.

An edge extraction unit 507 extracts a part having a large density variation in the input image data as an edge, from the input image data, so as to generate edge data that is described later. The edge extraction unit 507 performs, for example, a 9×9 filter operation, to thereby generate the edge data.

The process in the input image processing unit 500 is not limited to the above-mentioned process using all the units 501 to 506. Other image processing module may be added, or any of the units may be eliminated.

Further, the process order of the units 501 to 506 is not limited exclusively to this order.

Figure 5:
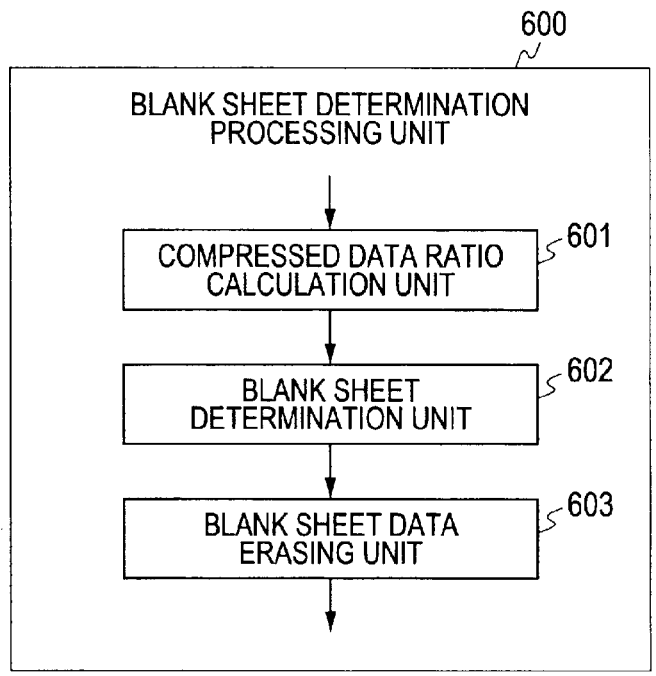
FIG. 5 illustrates a blank sheet determination processing unit that is suited for application of the present invention.

FIG. 5 is a block diagram illustrating a configuration of the blank sheet determination processing unit of the image processing apparatus according to an embodiment of the present invention.

In the drawing, a compressed data ratio calculation unit 601 calculates a compressed data ratio of the compressed edge data. Here, the data may be in any other form than the compressed form, as long as a variance value of the data may be determined. The variance value of data means an index of variation of read values of data of pixels forming the image data from an average value (displacement distance from the average value).

A blank sheet determination unit 602 performs a blank sheet determination process based on the compressed data ratio (variance value) calculated by the compressed data ratio calculation unit (variance value obtaining unit) 601. When this compressed data ratio (variance value) is smaller than a threshold value, it is determined that the data is on a blank sheet. When the compressed data ratio (variance value) is equal to or larger than the threshold value, it is determined that the data includes print information (details of this determination method are described later). A blank sheet data erasing unit 603 erases image data that is determined to be on a blank sheet by the blank sheet determination unit 602. The erased blank sheet data is described later.

{Operation Unit}

Figure 6:
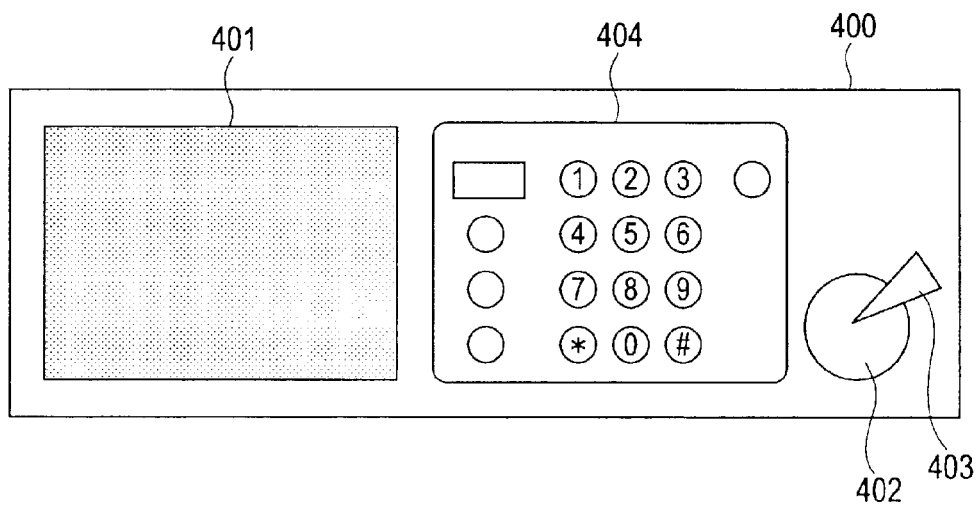
FIG. 6 illustrates an operation unit of the digital multifunction printer that is suited for application of the present invention.

FIG. 6 illustrates an example of the operation unit 400 of the digital multifunction printer that is suited for application of this embodiment. An LCD operation panel 401 is a combination of a liquid crystal display and a touch panel, on which details of settings, software keys, and the like are displayed. A start key 402 is a hardware key for instructing to start a copy operation or the like, in which a green LED and a red LED are incorporated. The green LED is turned on when start is ready, while the red LED is turned on when start is not ready. A stop key 403 is a hardware key that is used for stopping the operation. A hardware key group 404 includes ten numerical keys, a clear key, a reset key, a guide key, and a user mode key.

{Blank Sheet Skip Function Setting}

Figure 7:
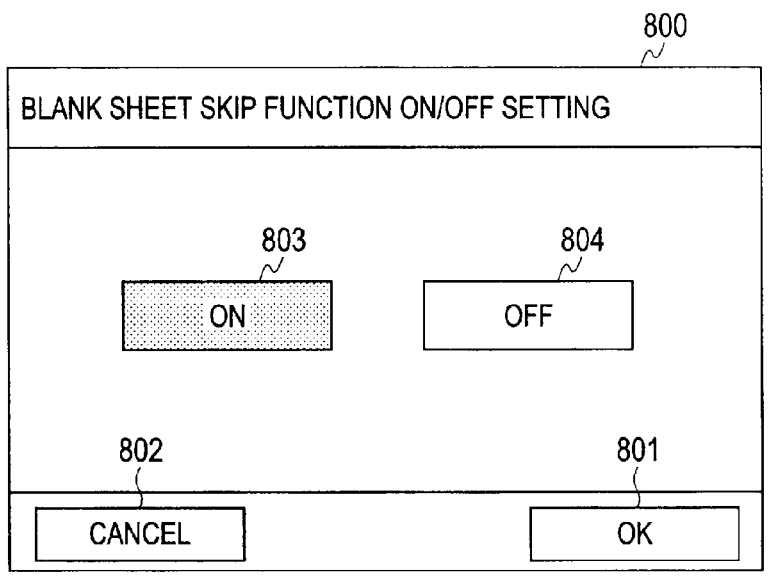
FIG. 7 illustrates an example of a functional operation screen employed for a blank sheet skip function.

FIG. 7 illustrates an example of an operation screen 800 for setting ON/OFF of the blank sheet skip function.

In the blank sheet skip function ON/OFF setting screen, a blank sheet skip ON button 803, a blank sheet skip OFF button 804, an OK button 801, and a cancel button 802 are disposed.

The user designates whether or not to perform the blank sheet skip function by operating the ON button 803 and the OFF button 804.

Figure 8:
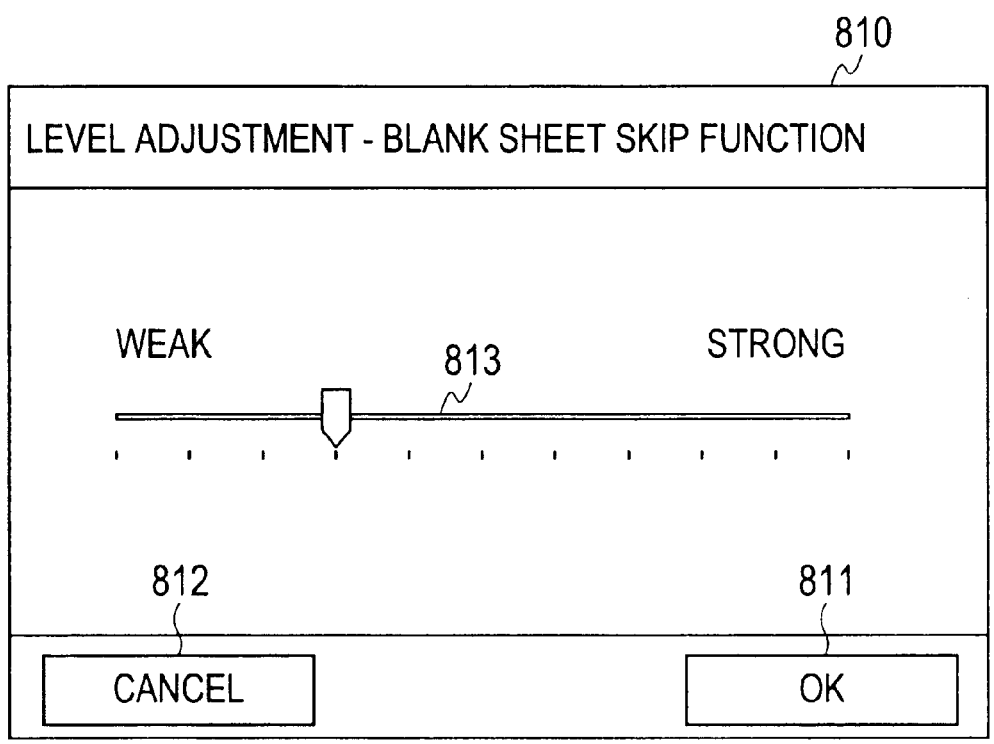
FIG. 8 illustrates an example of a threshold level operation screen employed for the blank sheet skip function.

When the ON button 803 is pressed, the screen display changes to a level adjustment screen 810 of the blank sheet skip function illustrated in FIG. 8.

When the OK button 801 is pressed, the ON/OFF setting of the blank sheet skip function that was displayed just before is saved, and the operation screen is closed. When the cancel button 802 is pressed, the ON/OFF setting of the blank sheet skip function just before opening the operation screen is saved, and the operation screen is closed.

FIG. 8 illustrates an example of the operation screen 810 for the user to set a threshold value that is used for the blank sheet skip function. In this embodiment, when the blank sheet skip function is set to be ON, "compression quantity of the edge data (variance value)" is used for determining whether or not the image data is the blank sheet. (Details thereof are described later.)

In a level adjustment setting screen of the blank sheet skip function, a blank sheet skip function level adjustment bar 813, an OK button 811, and a cancel button 812 are arranged. The user operates the level adjustment bar 813, to thereby change a threshold value about the compression quantity (variance value) of the edge data that is used for the blank sheet determination. When the user operates the level adjustment bar 813 to be set to "STRONG", the read image data is apt to be determined to be on a blank sheet.

When the OK button 811 is pressed, the level adjustment setting that was displayed just before that is saved, and this operation screen is closed. When the cancel button 812 is pressed, the setting just before opening the operation screen is saved, and this operation screen is closed.

Hereinafter, the image processing in this embodiment is described with reference to FIGS. 3 to 5.

When image data is read from the scanner 200, the CPU 103 transmits the image data to the input image processing unit 500. As illustrated in FIG. 4, the input image processing unit 500 performs image processings 501 to 506 on the received image data.

In addition, simultaneously with the image processing, the input image processing unit 500 performs a filtering process for edge enhancement on the image data received by the edge extraction unit 507, to thereby calculate edge intensity in the image data.

In addition, the edge extraction unit 507 next performs a threshold value process on the calculated edge intensity. When the edge intensity value is equal to or larger than the threshold value, it is determined that there is an edge. When the edge intensity value is smaller than the threshold value, it is determined that there is no edge. For instance, this threshold value is usually set to 128. When the edge intensity is equal to or larger than 128, it is determined that there is an edge, while it is determined there is no edge when the edge intensity is smaller than 128. The user may set this threshold value in advance.

Using this result, presence or absence of the edge in pixels constituting the image data is indicated for each bit so as to generate data. This data is referred to as edge data in this specification.

A common filter such as a Laplacian filter is used for the filtering process, but the present invention is not particularly limited to this method.

Next, the compression/decompression processing unit 109 performs processes on the image data processed by the input image processing unit 500 and the edge data generated by the edge extraction unit 507. For instance, a JPEG compression process is performed on the image data, and a JBIG compression process is performed on the edge data.

The compression method is not limited to the above-mentioned methods, and any compression method that is suited for multivalued data may be used for the image data. In addition, for the edge data, there may be used a compression method that makes a small data quantity for data having a small variance value and makes a large data quantity for data having a large variance value.

In addition, concerning the compression of the edge data, the data may be in any other form than the compressed form, as long as a variance value indicating a variance of the edge data may be obtained. This is because there is a direct relationship between the variance value and the compression ratio in which the compression ratio becomes low when the variance value is low indicating a small variance, while the compression ratio becomes high when the variance value is high indicating a large variance.

In addition, when saving the image data read by the image processing apparatus of this example, the edge data is compressed and saved. Therefore, when the variance value is obtained by using the compression, another merit may be obtained. That is, a new configuration for obtaining the variance value is not necessary, and performance is improved.

The CPU 103 writes the edge data and the image data compressed by the compression/decompression processing unit 109, in the storage unit 107.

Hereinafter, the blank sheet determination process flow in this embodiment is described with reference to FIG. 9.

Figure 9:
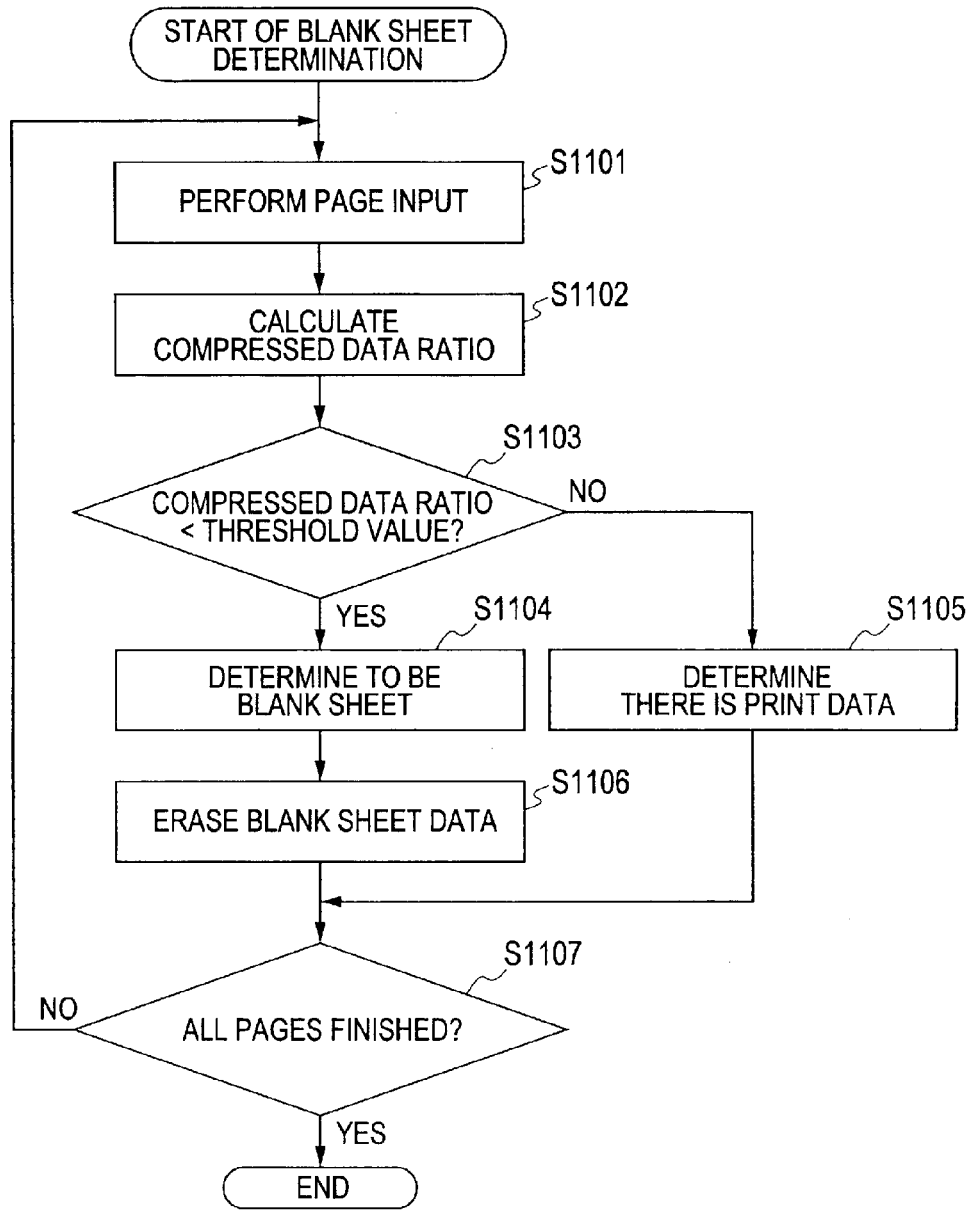
FIG. 9 illustrates a process flow of the first embodiment according to the present invention.

FIG. 9 is a diagram illustrating a process flow of the blank sheet determination process in this embodiment.

Note that the procedure illustrated in the flowchart is stored in any one of storage devices including a RAM, a ROM and an HDD (not shown), and is executed by the CPU 103 illustrated in FIG. 3.

When the blank sheet skip function is set to ON, the CPU 103 reads the image data and the edge data stored in the storage unit 107, page by page in S1101.

Next in S1102, the compressed data calculation (variance value obtaining) unit 601 calculates the compressed data ratio (variance value) from the edge data read in S1101. The CPU 103 transmits the compressed data ratio to the blank sheet determination unit 602.

In S1103, the blank sheet determination unit 602 compares the compressed data ratio (variance value) of the received edge data with a threshold value set in the level adjustment setting screen 800 of the blank sheet skip function.

Here, this threshold value is described.

For example, edge detection is performed from an original without print information (in colored background or white background), and the edge data is compressed by using a result of the edge detection. Then, the compressed data ratio, which is expressed as (data quantity after the compression)/(data quantity before the compression), becomes approximately $3.0 \times 10^{-5}$%.

On the other hand, when the edge data is compressed by using an original of white color with minute print information such a page number, the compressed data ratio thereof becomes approximately $7.0 \times 10^{-5}$%.

In order to discriminate between the two types of originals having the above-mentioned compressed data ratios, so as to determine the original without print information as a blank sheet, the threshold value of the compressed data ratio of the edge data is set to "$5.0 \times 10^{-5}$%". Note that this threshold value varies according to a threshold value of the edge detection or equipment that is used. In addition, the user may set the threshold value in advance.

When the compressed data ratio of the edge image is the threshold value or smaller (variance value is smaller than the threshold value), it is determined that the data is on a blank sheet in S1104. In addition, as a result of the comparison, when the compressed data ratio is larger than the threshold value (variance value is equal to or larger than the threshold value), it is determined in S1105 that there is print information. Here, when the compressed data ratio of the edge data is large (variance value is equal to or larger than the threshold value), it means that there are many pixels in the image data in which density changes rapidly. In other words, it may be determined that there is certain print information in the image.

In addition, when the compressed data ratio is small (variance value is smaller than the threshold value), the density in the image data is uniform, and hence it may be determined that there is no print information.

For instance, when the JPEG compression is performed on the read image data, a tendency about presence or absence of print information in the read image data may also be obtained by using the compressed data. However, as described above, there is a very small difference between the data quantity after the compression of the image data when a white color original with minute print information is read and the data quantity after the compression of the image data when a colored original with no print information is read, because of an influence of read noise. Therefore, it is difficult to discriminate whether or not the data is on a blank sheet using the both data quantities. In contrast, in this embodiment, the compressed data ratio of the edge data is used for the blank sheet determination. Therefore, the influence of read noise may be reduced, so that the white color original with print information and the colored original with no print information may be discriminated from each other.

Note that this read noise is noise that was not removed by a noise removal filter in the reading process.

When the blank sheet determination unit 602 determines that the read image data is a blank sheet, the blank sheet data erasing unit 603 erases the image data thereof in S1106.

In this case, the CPU 103 may notify the user about the page of the image data determined to be a blank sheet by the blank sheet determination unit 603, by using display device (not shown). Further, when the user is notified, the user may give an instruction to change the result of the determination so that the blank sheet determination unit 603 does not erase the image data that is determined to be a blank sheet.

Next, in S1107, it is determined whether or not the blank sheet determination process is finished for all pages of the image data input in S1101. Here, when it is determined that all pages are not finished, the process returns to S1101, and the process of the next page is performed.

When it is determined in S1107 that all pages are finished, the process of the blank sheet determination processing unit 600 is finished.

Next, the compression/decompression processing unit 109 performs decompression of the image data of the page that is determined to have print information by the blank sheet determination processing unit 600.

Meanwhile, the image data that is determined in S1106 to be erased may be stored in the storage unit with a flag being set for indicating that decompression should not be performed, instead of actually erasing the data.

Next, the CPU 103 transmits the image data to the output image processing unit 700, and the output image processing unit 700 performs the correction and the resolution conversion that are adapted to the printer 300.

Next, the CPU 103 transmits the image data to the printer 300 and performs the print process.

In addition, when performing a faxing process or a transmission process, the image data may be transmitted via the LAN 800 or the public network 900 without performing the decompression by the compression/decompression processing unit 109.

In this embodiment, an influence of the read noise may be reduced by generating the edge data from the read image data so as to perform the blank sheet determination based on the compressed data ratio of the edge data. Thus, the white color original with minute print information and the colored original with no print information may be discriminated from each other.

Second Embodiment

Here, a method of performing the blank sheet determination from the compressed data ratio of the edge data and an edge ratio of the edge data in the blank sheet skip function is described.

In the first embodiment described above, the white color original with print information and the colored original with no print information, such as colored paper, may be discriminated from each other by using the compressed data ratio of the edge data.

However, in the case of an original with many impurities, such as recycled paper (recycled paper original), an impurity may be determined to be an edge and may be extracted. In other words, when edge data due to random noise is extracted from the entire surface of the original, the compressed data ratio of the edge data may be increased despite that the original includes no print information thereon. In contrast, the compressed data ratio of the edge data in the white color original with minute print information is small.

Whether or not the image data has print information determines whether or not the image data is significant. In this case, however, the image data without print information should be determined to be a blank sheet. Therefore, the above-mentioned recycled paper original without print information should be determined to be a "blank sheet", while the white paper with print information should not be determined to be a "blank sheet".

However, in the determination of using only the compressed data ratio of the edge data, the threshold value of the compressed data ratio of the edge data should be set to a large value in order to determine the recycled paper original without print information to be a blank sheet.

Consequently, a white paper with minute print information that has a smaller compressed data ratio of the edge data than the recycled paper has may also be determined to be a blank sheet.

Therefore, in this embodiment, in addition to the compressed data ratio of the edge data that is used in the first embodiment, the edge ratio of the edge data is also used for the blank sheet determination.

Figure 12A:
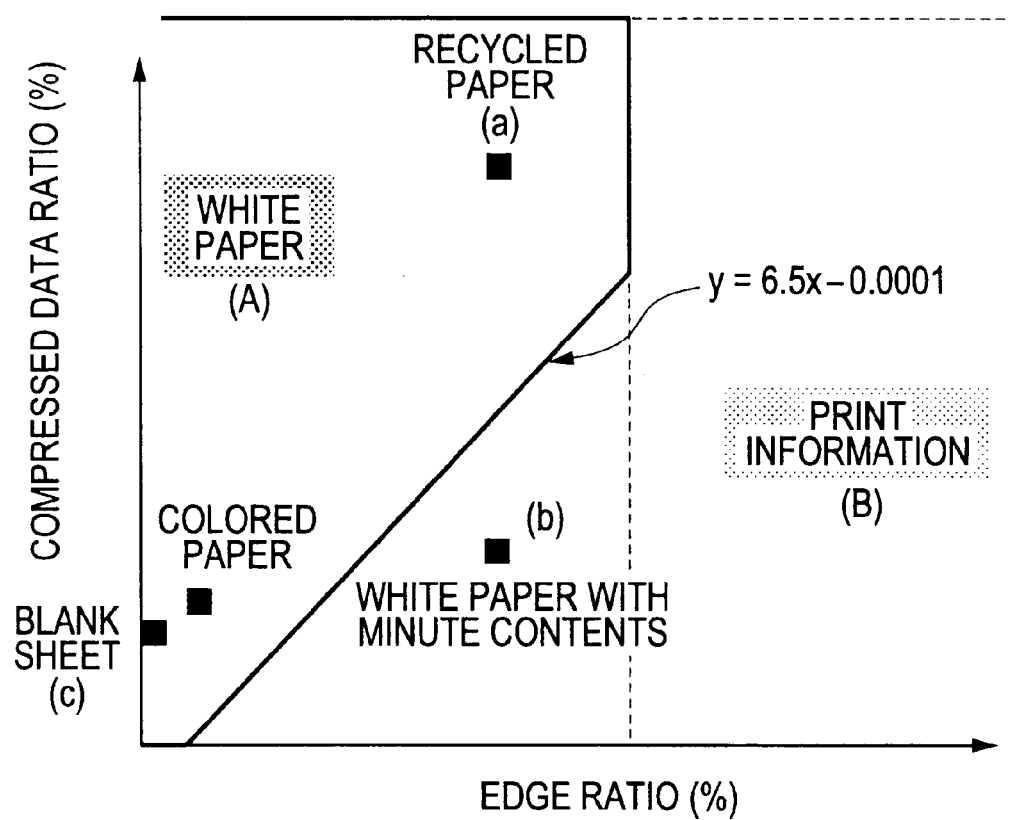
FIG. 12A illustrates an example of threshold value setting according to the present invention.

FIG. 12A illustrates a relationship between the edge ratio expressed as (the number of edge pixels)/(the total number of pixels) (%) and the compressed data ratio expressed as (data quantity after the compression)/(data quantity before the compression) on a two-dimensional plane. The x-axis represents the edge ratio expressed as (the number of edge pixels)/(the total number of pixels) (%), and the y-axis represents the compression ratio expressed as (data quantity after the compression)/(data quantity before the compression) (%). On this plane, values obtained from originals of different paper types and background colors are plotted.

As illustrated in FIG. 12A, even when the edge ratio in the edge data is substantially the same between the recycled paper original without print information (a) and the white paper with minute print information (b), the compression data ratio of the edge data in the recycled paper original without print information becomes large because of the above-mentioned reason. On the other hand, the compressed data ratio of the edge data in the white paper with minute print information becomes small.

In this way, when only the edge ratio is used as a criterion for the blank sheet determination, only the recycled paper original without print information may not be determined to be a blank sheet. Therefore, as illustrated in FIG. 12A, a threshold value using a linear function is provided.

For instance, when the edge data is generated by using the above-mentioned edge threshold value, the point (c) indicating data of the blank sheet is plotted at the coordinates (x, y)=($2.5 \times 10^{-6}$, $3.0 \times 10^{-5}$), and the point (a) indicating data of the recycled paper is plotted at the coordinates (x, y)=($3.0 \times 10^{-6}$, y=$5.81 \times 10^{-4}$).

In addition, the point (b) indicating data of the page number that is the white paper with minute contents is plotted at the coordinates (x, y)=($7.6 \times 10^{-5}$, y=$6.7 \times 10^{-5}$).

Among them, the white paper without print information and the recycled paper original without print information are determined to be a blank sheet. On the other hand, the white paper with minute contents such as a page number and the recycled paper original with minute contents are determined not to be a blank sheet. For this purpose, the threshold value is set to be $y=ax+b$ ($a=6.5$, $b=-0.0001$). Further, when both the edge ratio and the compressed data ratio reach predetermined values, the threshold value is not a linear function but both the x-axis and the y-axis become constant values.

For example, when the value of the x-axis reaches $1.0\times10^{-4}$, the threshold value becomes the constant value ($x=1.0\times10^{-4}$). Similarly, the value of the y-axis reaches $1.0\times10^{-3}$, the threshold value becomes the constant value ($y=1.0\times10^{-3}$).

The linear function, the x-axis, and a straight line parallel to the y-axis separate the area in FIG. 12A into the area (A) of values of the blank original without print information and the area (B) of values of the original with print information.

Therefore, as illustrated in FIG. 12A, by providing the threshold value expressed by the linear function, it is possible to determine that the recycled paper original without print information is a blank sheet and that the white paper with minute print information is not a blank sheet.

Figure 12B:
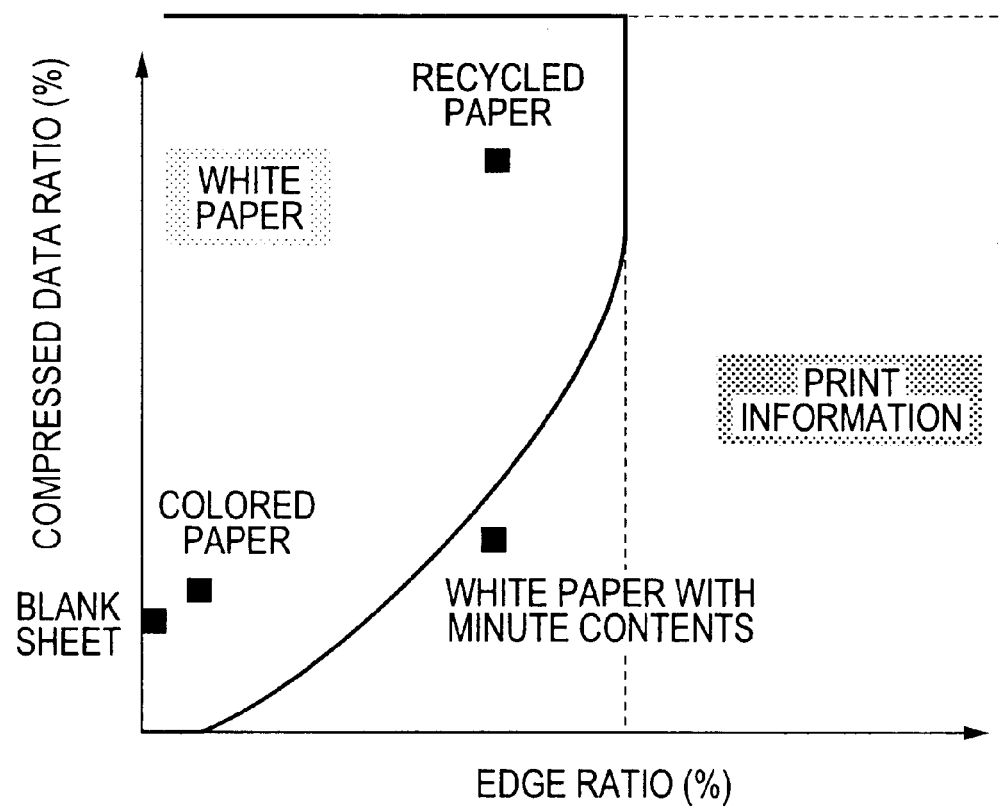
FIG. 12B illustrates another example of threshold value setting according to the present invention.

In addition, the threshold value in this embodiment may be a threshold value expressed by a straight line as illustrated in FIG. 12A or may be a threshold value expressed by a curve as illustrated in FIG. 12B. In addition, values that are determined experimentally are used for this threshold value. In addition, the coefficients "a" and "b" in the above equation also change according to conditions of the device or the like. Those values may also be set by the user in advance.

Hereinafter, the image processing in this embodiment is described with reference to FIG. 10.

Figure 10:
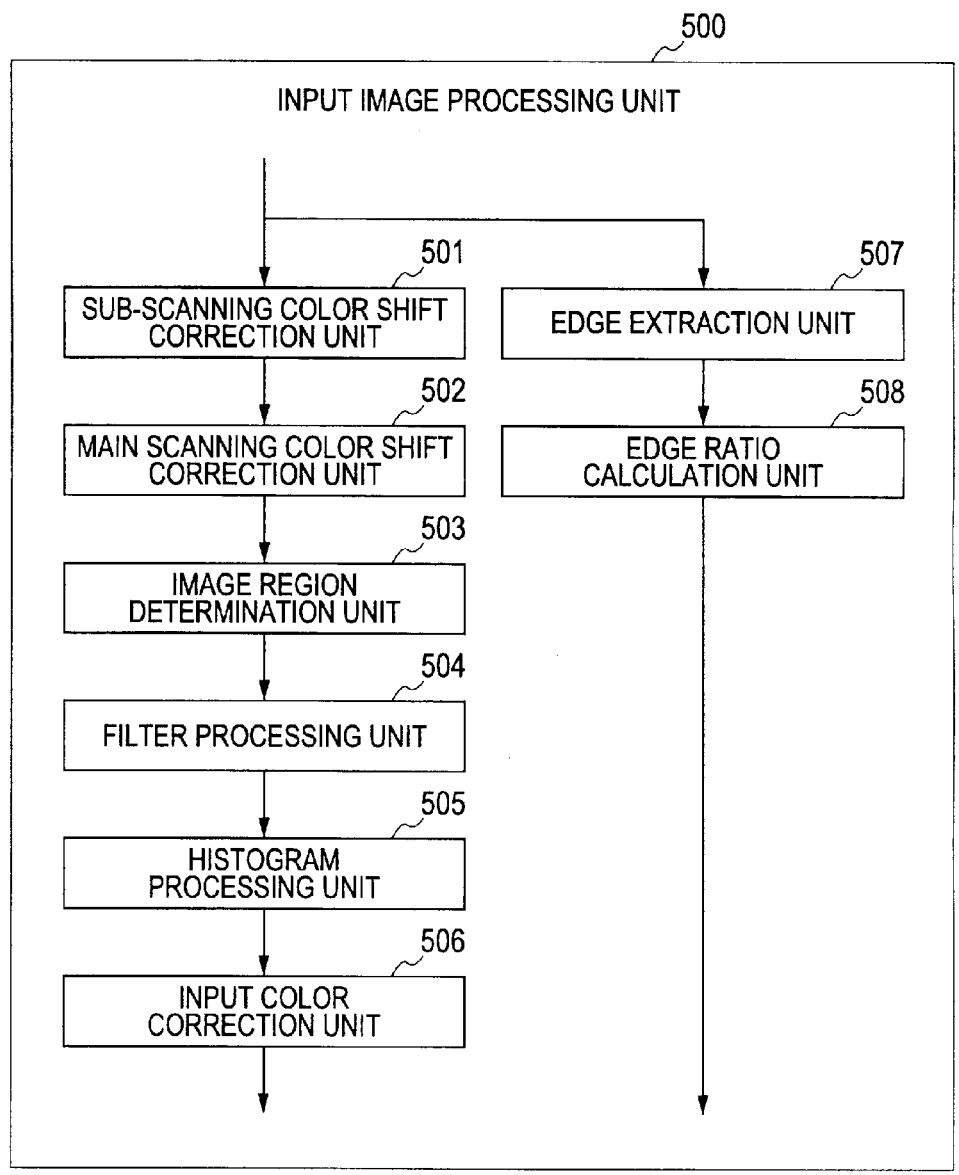
FIG. 10 illustrates an input image processing unit of a second embodiment according to the present invention.

FIG. 10 illustrates a configuration of the input image processing unit 500 when the blank sheet determination is performed based on the compressed data ratio and the edge ratio of the edge data.

Here, the units 501 to 507 are the same as those in the first embodiment, and hence descriptions thereof are omitted. An edge ratio calculation unit 508 performs calculation of the edge ratio of the edge data generated by the edge extraction unit 507. Here, the edge ratio means a value obtained by counting the number of pixels having a value in the edge data generated by the edge extraction unit 507 and dividing the counted number by the total number of pixels.

Here, the edge ratio calculation unit 508 is included in the input image processing unit 500, but the present invention is not limited thereto and the edge ratio calculation unit 508 may be included in the blank sheet determination processing unit 600.

The blank sheet determination unit 602 performs the blank sheet determination by using the compressed data ratio of the edge data calculated by the compressed data ratio calculation unit 601 and the edge ratio calculated by the edge ratio calculation unit 508.

In addition, similarly to the first embodiment, the data may be in any other form than the compressed form, as long as a variance value is obtained.

For instance, the process from obtaining the image data by reading the original with the scanner 200 until extracting the edge by the edge extraction unit 507 of the input image processing unit 500 is the same as that in the first embodiment, and hence the description thereof is omitted.

Next, the edge ratio calculation unit 508 of the input image processing unit 500 calculates the edge ratio in the image data from the edge data generated by the edge extraction unit 507.

The CPU 103 transmits the calculated edge ratio to the blank sheet determination processing unit 600.

Figure 11:
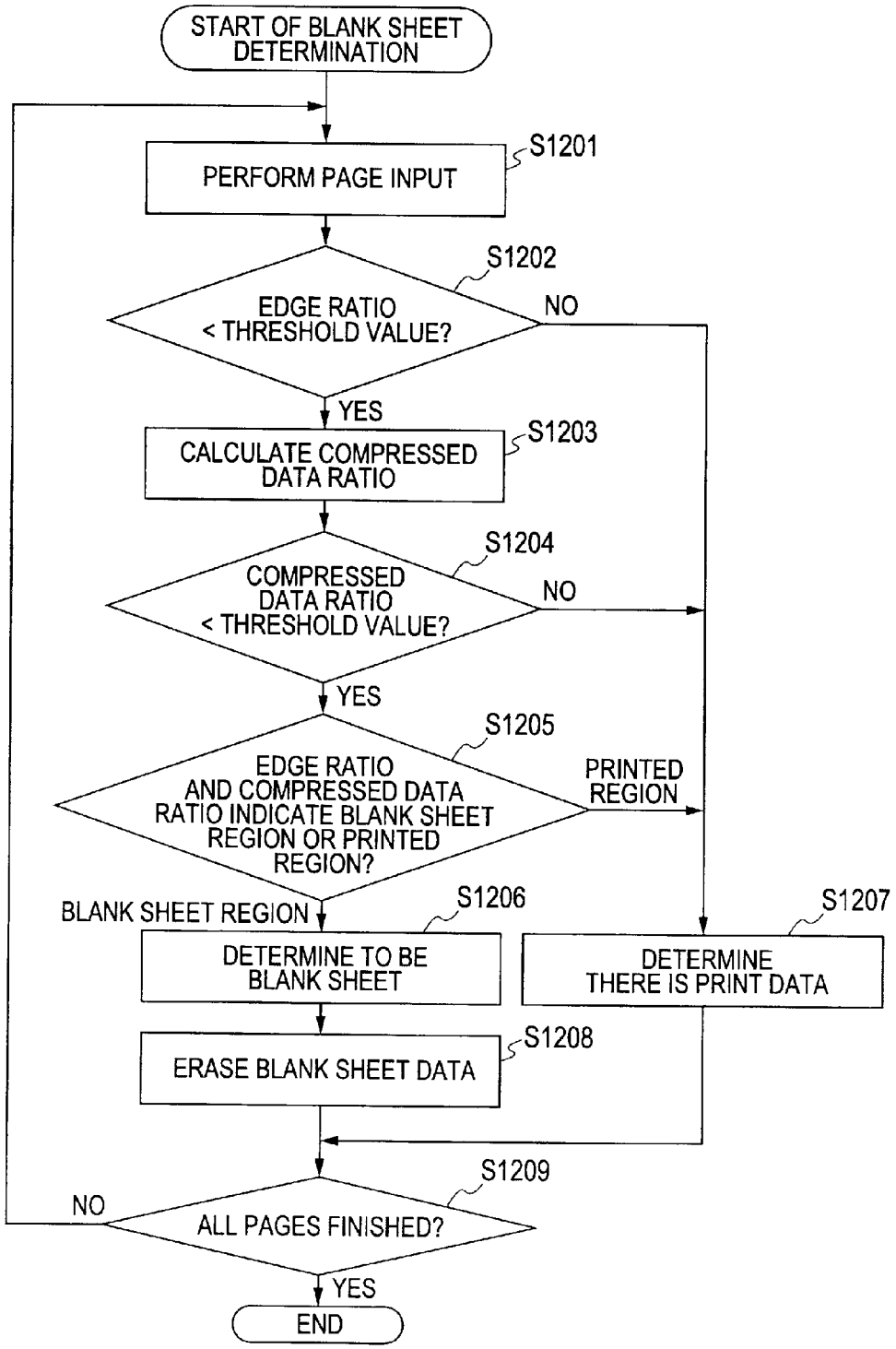
FIG. 11 illustrates a process flow of the second embodiment according to the present invention.

Hereinafter, the blank sheet determination process in this embodiment is described with reference to the flowchart illustrated in FIG. 11.

Note that the procedure illustrated in the flowchart is stored in any one of storage means including a RAM, a ROM, and an HDD (not shown) and is executed by the CPU 103 illustrated in FIG. 3.

The image data and the edge data processed by the input image processing unit 500 are compressed by the compression/decompression processing unit 109 and are stored in the storage unit 107 similarly to the first embodiment.

When the blank sheet skip function is set to ON, the CPU 103 transmits the image data and the edge data stored in the storage unit 107 to the blank sheet determination processing unit 600. Then, the blank sheet determination processing unit 600 receives the image data and the edge data on a page basis (S1201).

Next, in S1202, the edge ratio of the received edge image is compared with a threshold value that is set in advance. When the edge ratio is smaller than the threshold value, the process proceeds to S1203. When the edge ratio is equal to or larger than the threshold value, it is determined that there is print information in S1207. This is performed for speeding up the process by eliminating the subsequent blank sheet determination process when the edge ratio is a certain value or larger, which is regarded to have print information.

Next, in S1203, the compressed data calculation unit calculates the compressed data ratio (variance value) of the edge data from the edge data received in S1201.

Next, in S1204, the compressed data ratio is compared with the threshold value that is set in advance. As a result of this comparison, when the compressed data ratio is smaller than the threshold value, the compressed data ratio of the edge data is transmitted to the blank sheet determination unit 602, and the process proceeds to S1205. When the compressed data ratio is equal to or larger than the threshold value, it is determined in S1207 that there is print information. This is also performed for the purpose of speeding up the process similarly to S1202, and all the data may be determined in S1205 without providing S1202 and S1204.

Next, in S1205, the blank sheet determination unit 602 compares the compressed data ratio of the received edge data and the edge ratio with the threshold values illustrated in FIGS. 12A and 12B, so as to determine whether the read original is a blank sheet or with print information.

The determination method may be a method of determining by calculation or a method of determining by using a look up table (LUT) that is prepared in advance.

Hereinafter, the process from S1206 to S1209 after the blank sheet determination, the process after that until the printer output, and the data transmission process using the LAN 800 or the public network 900 are the same as the first embodiment, and hence the descriptions thereof are omitted.

In this embodiment, by performing the blank sheet determination using the edge ratio and the compressed data ratio of the edge data, it is possible to discriminate between the original including impurities but not print information, like a recycled paper original, and the white paper with minute print information.

Third Embodiment

Here, the case of using the image region determination unit 503 as a method of performing the edge extraction for the blank sheet determination in the blank sheet skip function is described.

In this embodiment, the attribution flag data extracted by the image region determination unit 503 is used as the edge data in the blank sheet determination process.

Here, the attribution flag data is data indicating an image type of a photograph part or a character part, a chromatic part or an achromatic part, and the like. This attribution flag data is used as the edge data in this embodiment. In addition, the attribution flag data is a one-bit image data constituted of a value "1" or "0" indicating the photograph part or the character part.

When the edge extraction is performed, e.g., in the case of the edge extraction method such as a Laplacian filter, an edge of the image data printed with dots is also detected. Therefore, the dots are detected like noise in the reading process depending on an original to give the compressed data ratio and the edge ratio comparative to those of a recycled paper original without print information. Therefore, when the edge of the image data printed with dots is used, the read original may be determined to be a blank sheet similarly to the recycled paper original without print information despite of having print information.

In this way, the edges occur periodically in the part of dots, while the edge does not occur periodically in the character part. Therefore, the image region determination unit 503 may separate the part of dots from the character part. The part of dots is regarded as other than the photograph part or the character part and is assigned with the attribution flag "0". Thus, the image region flag data "1" is not generated for the part of dots. Therefore, it is possible to reduce detection error of determining the image data with print information to be a blank sheet as a result of detecting the dots and increasing the edge detection.

Figure 13:
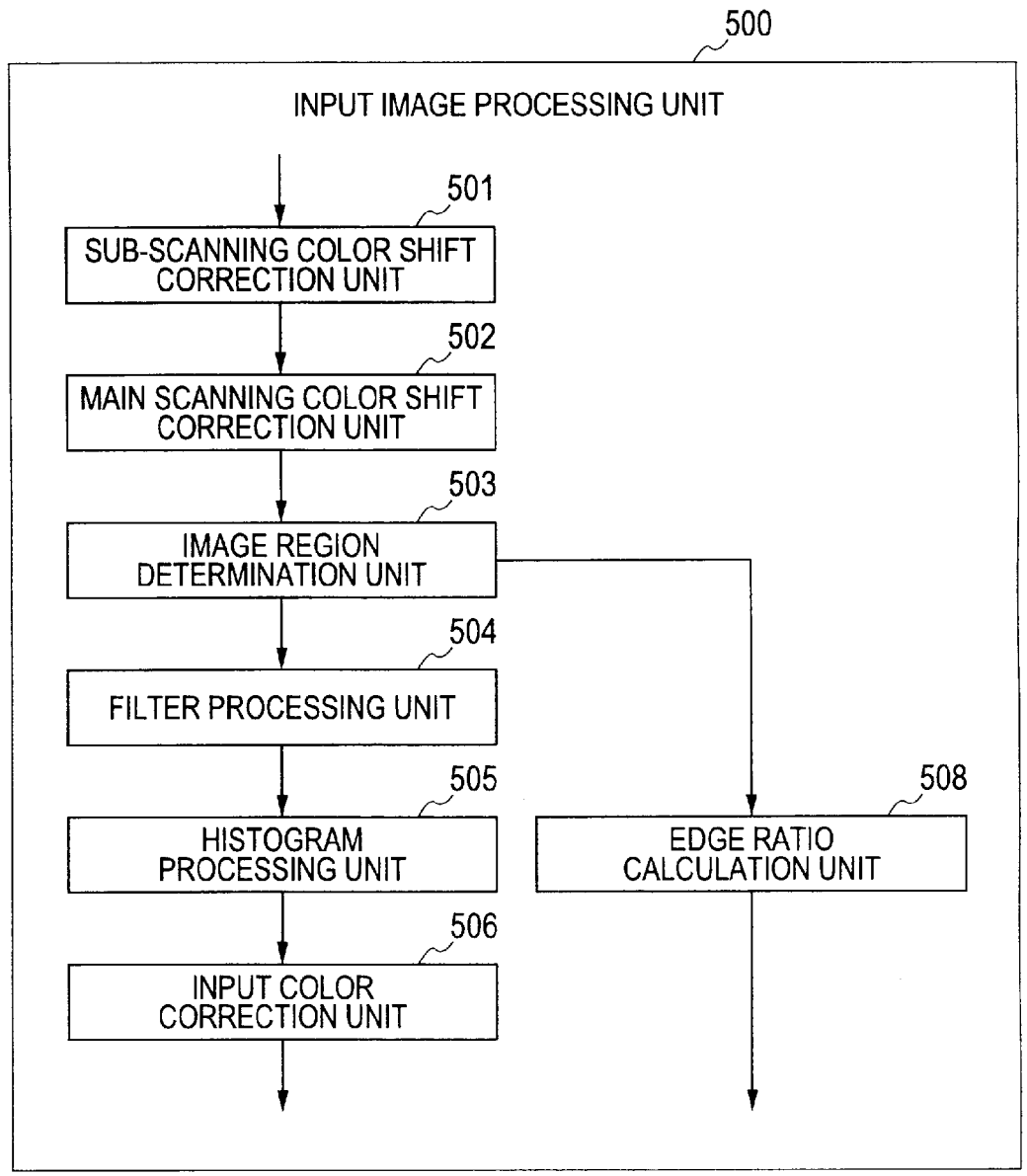
FIG. 13 illustrates an input image processing unit of a third embodiment according to the present invention.

FIG. 13 illustrates a configuration of the input image processing unit 500 in the case where the image region determination unit 503 is used as the edge extraction method.

Details of the individual units are the same as the first embodiment and the second embodiment, and hence the descriptions thereof are omitted. However, the image region determination unit 503 transmits the image data to the filter processing unit 504 and transmits the attribution flag data to the edge ratio calculation unit 508.

In addition, the edge ratio calculation unit 508 calculates a value obtained by counting the effective pixels of the attribution flag data generated by the image region determination unit 503 and dividing the counted value by the total number of pixels. Here, the effective pixel means a pixel in which "1" is stored as the one-bit data of the attribution flag data.

The process flow of the blank sheet determination and the process flow after the blank sheet determination are the same as those in the first embodiment and the second embodiment, and hence descriptions thereof are omitted.

However, in the blank sheet determination unit 602, the blank sheet determination is performed by using the compressed data ratio of the attribution flag data generated by the image region determination unit 503. In addition, the blank sheet determination may be performed based on the compressed data ratio and the edge ratio of the attribution flag data.

In this embodiment, the attribution flag data extracted by the image region determination unit 503 is used as the edge data, to thereby reduce the detection error of a blank sheet due to detection of dots. In addition, the blank sheet determination process may be performed by using the current configuration of the digital multifunction printer without separately providing a special edge extraction unit. In addition, the process time may be shortened significantly by using the data calculated from a usual process flow.

Fourth Embodiment

Here, a method of changing the threshold value depending on a paper type of the original to be read in the blank sheet skip function is described.

For instance, a ratio of impurities mixed in the recycled paper or the like is different depending on the type thereof.

Figure 15:
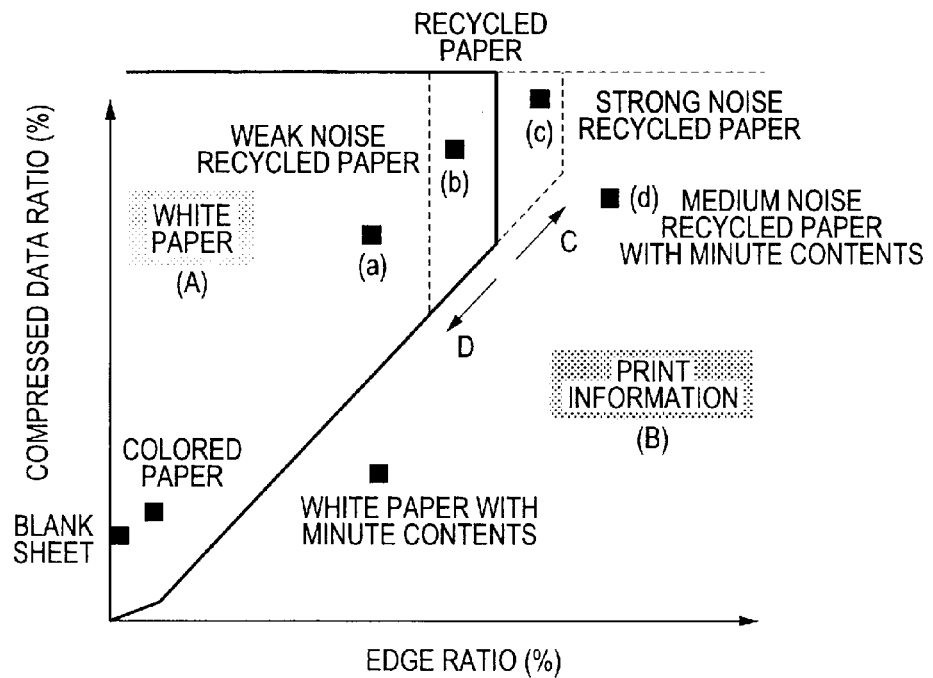
FIG. 15 illustrates an example of threshold value setting in a fourth embodiment according to the present invention.

A recycled paper with more impurities (strong noise recycled paper) is indicated by the point (c) having the coordinates $(x, y)=(1.4\times10^{-4}, 9.2\times10^{-4})$ as illustrated in FIG. 15. In contrast, an original of the recycled paper (medium noise recycled paper) with minute print information is indicated by the point (d) having the coordinates $(x, y)=(1.6\times10^{-4}, 6.3\times10^{-4})$. Therefore, the point (c) and the point (d) may fall into the same area when the threshold value described above in the second embodiment is used. Therefore, it is difficult to determine the recycled paper original with strong noise to be a blank sheet without print information.

Therefore, in this embodiment, the threshold value is changed depending on a paper type, so that the recycled paper with many impurities (strong noise recycled paper) and the original of recycled paper (medium noise) with minute print information are discriminated from each other.

Figure 14:
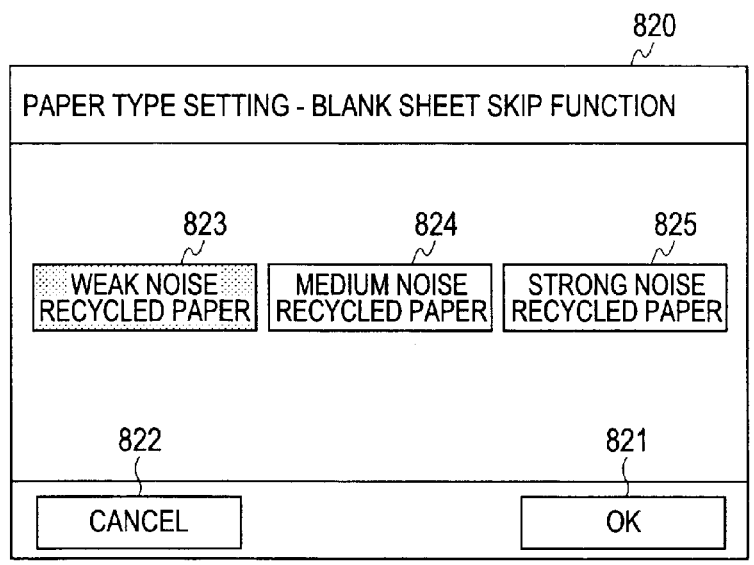
FIG. 14 illustrates an example of a paper type setting screen employed for the blank sheet skip function.

FIG. 14 illustrates an example of a paper type setting screen 820 for registering a paper type.

In the paper type setting screen of the blank sheet skip function, there are arranged a weak noise recycled paper button 823, a medium noise recycled paper button 824, a strong noise recycled paper button 825, an OK button 821, and a cancel button 822. The user may change a threshold value that is used for the blank sheet determination depending on the paper type by operating the weak noise recycled paper button 823, the recycled paper button 824, or the strong noise recycled paper button 825.

When the OK button 821 is pressed, details of the paper type settings that have been displayed just before is saved, and the operation screen is closed. When the cancel button 822 is pressed, the details of settings just before the operation screen is opened is saved, and the operation screen is closed.

The paper type setting screen illustrated in FIG. 14 may be displayed by pressing a button for transition which may be disposed on the level adjustment screen 810 of the blank sheet skip function illustrated in FIG. 8. Alternatively, the weak noise recycled paper button 823, the recycled paper button 824, and the strong noise recycled paper button 825 may be disposed on the level adjustment screen 810 of the blank sheet skip function.

In this embodiment, the weak noise recycled paper button 823, the medium noise recycled paper button 824, and the strong noise recycled paper button 825 are disposed, but it is sufficient when at least one of the buttons in addition to the medium noise recycled paper button 824 is disposed. Alternatively, another button may be additionally provided.

FIG. 15 illustrates the threshold value in this embodiment. The threshold value is changed as illustrated by the arrow C or D based on the value set on the paper type setting screen 820.

On the paper type setting screen 820 illustrated in FIG. 14, when a recycled paper 824 with medium noise is set, the original having a value in the area (B) that is outside a blank sheet standard of the "recycled paper (b)" illustrated in FIG. 15 is determined to be the original with print information that is not a blank sheet.

On the other hand, in FIG. 14, the original as a target of determination is set as a recycled paper 825 with strong noise including many impurities. The compressed data ratio of this recycled paper original is larger than that of the recycled paper original with the medium noise, so that it may be determined to have print information, despite of having no print information actually.

Therefore, when it is set to use the strong noise recycled paper original, the area of determining to be a blank sheet is set to be large. Specifically, the threshold value parallel to the y-axis is moved in a direction indicated by the arrow C as illustrated in FIG. 15. For instance, the threshold value of $x=1.0\times10^{-4}$ is set to approximately $1.5\times10^{-4}$. Then, as to the point (c) and the point (d), the recycled paper original with strong noise indicated by the point (c) having the coordinates $(x, y)=(1.4\times10^{-4}, 9.2\times10^{-4})$ may belong to the blank sheet region (A), so that it may be determined to be a blank sheet without print information.

On the other hand, the point (a) indicating the data of the recycled paper original with little impurities has the coordinates $(x, y)=(6.9\times10^{-5}, 2.8\times10^{-4})$. Even when print information is added to the recycled paper original, those coordinates belong to the blank sheet region (A). Therefore, in this case, the area to be determined to be a blank sheet is set to be small, so that the recycled paper original with little impurities is easily determined to be a blank sheet. Specifically, the threshold value parallel to the y-axis is moved in a direction indicated by the arrow D in FIG. 15. For instance, the threshold value of $x=1.0\times10^{-4}$ is set to approximately $8.0\times10^{-5}$. Then, the recycled paper with weak noise having print information belongs to the area (B) of having print information. Therefore, only the recycled paper original without print information (a) may be determined to be a blank sheet.

In this way, in the blank sheet determination process, the CPU 103 retrieves the threshold value depending on the paper type set on the paper type setting screen 820 so as to change the threshold value, so that the blank sheet determination unit 602 performs the blank sheet determination.

The process flow of the blank sheet determination process is the same as that of the second and the third embodiments, so the description thereof is omitted.

In this embodiment, the threshold value is changed depending on the paper type of the original, so that an original with print information and a blank sheet that is an original without print information may be discriminated from each other even when a ratio of impurities mixed in the paper is not constant.

(Other Embodiments)

Aspects of the present invention may also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-163921 filed Jul. 10, 2009, which is hereby incorporated by reference herein in its entirety.

The invention claimed is:

1. An image processing apparatus, comprising:
an edge data generating unit configured to detect an edge from image data and to generate edge data indicating a result of the detection;
a variance obtaining unit configured to obtain a variance of the edge data generated by the edge data generating unit; and
a determining unit configured to determine that the image data is data with print information when the variance of the edge data obtained by the variance obtaining unit is equal to or larger than a threshold, and to determine that the image data is data without print information when the variance is smaller than the threshold.

2. An image processing apparatus according to claim 1, wherein the determining unit includes a setting unit configured to set a threshold expressed by a linear function defined for discriminating between image data obtained when a recycled paper original is read on a two-dimensional plane and image data obtained when a white paper with minute print information is read in a case where a relationship between the variance of the edge data and an edge ratio detected from the edge data is expressed on the two-dimensional plane, and
wherein the determining unit determines that the image data is data with print information when the variance is equal to or larger than the threshold set by the setting unit, and determines that the image data is data without print information when the variance is smaller than the threshold.

3. An image processing apparatus according to claim 1, wherein attribution flag data obtained by image region determination of the image data is used as the edge data.

4. An image processing apparatus according to claim 2, wherein the image data is obtained by reading an original, and
wherein the image processing apparatus further comprises:
a setting unit configured to set data about a paper type of the original; and
a threshold changing unit configured to change a threshold of the edge ratio from the set data about a paper type.

5. An image processing apparatus according to claim 1, wherein the variance obtaining unit obtains the variance of the edge data by determining a compressed data ratio of the edge data generated by the edge data generating unit.

6. An image processing apparatus according to claim 1, wherein when the determining unit determine that the image data is data without print information, the image data without print information is determined to be a blank original.

7. A control method carried out by one or more processing units of an image processing apparatus, comprising:
detecting an edge from image data and generating edge data indicating a result of the detection;
obtaining a variance of the generated edge data; and
determining that the image data is data with print information when the obtained variance of the edge data is equal to or larger than a threshold, and determining that the image data is data without print information when the obtained variance is smaller than the threshold.

8. A control method according to claim 7, wherein the determining step includes setting a threshold expressed by a linear function defined for discriminating between image data obtained when a recycled paper original is read on a two-dimensional plane and image data obtained when a white paper with minute print information is read in a case where a relationship between the variance of the edge data and an edge ratio detected from the edge data is expressed on the two-dimensional plane, and wherein the determining step determines that the image data is data with print information when the variance is equal to or larger than the set threshold, and determines that the image data is data without print information when the variance is smaller than the set threshold.

9. A control method according to claim 7, wherein attribution flag data obtained by image region determination of the image data is used as the edge data.

10. A control method according to claim 8, wherein the image data is obtained by reading an original, and wherein the method further comprises:

setting data about a paper type of the original; and changing a threshold of the edge ratio from the set data about a paper type.

11. A control method according to claim 7, wherein the obtaining step obtains the variance of the edge data by determining a compressed data ratio of the generated edge data.

12. A control method according to claim 7, wherein when the determining step determines that the image data is data without print information, the image data without print information is determined to be a blank original.

13. A non-transitory computer-readable storage medium storing a computer-executable program for causing a computer to execute the control method according to claim 7.

* * * * *